No. 714,912. Patented Dec. 2, 1902.
A. H. JOHNSON.
PLOW COLTER.
(Application filed July 7, 1902.)
(No Model.)
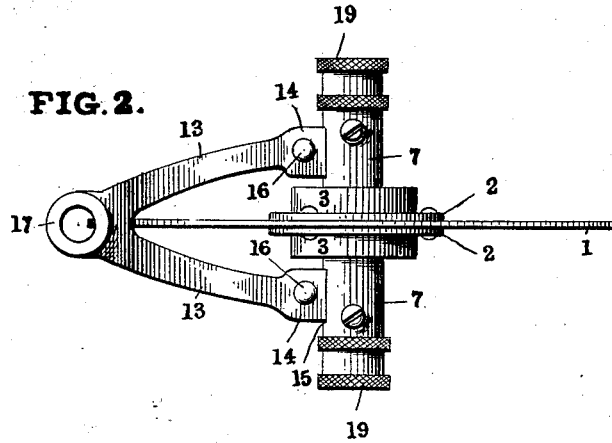
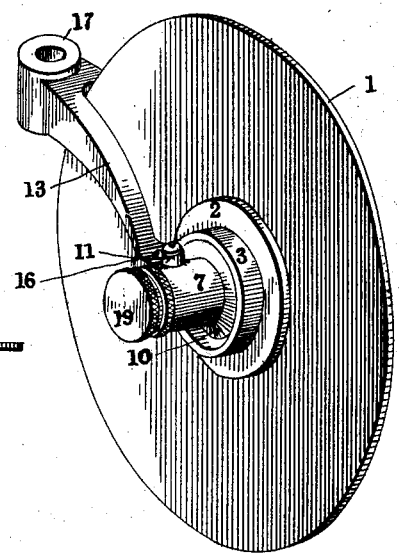
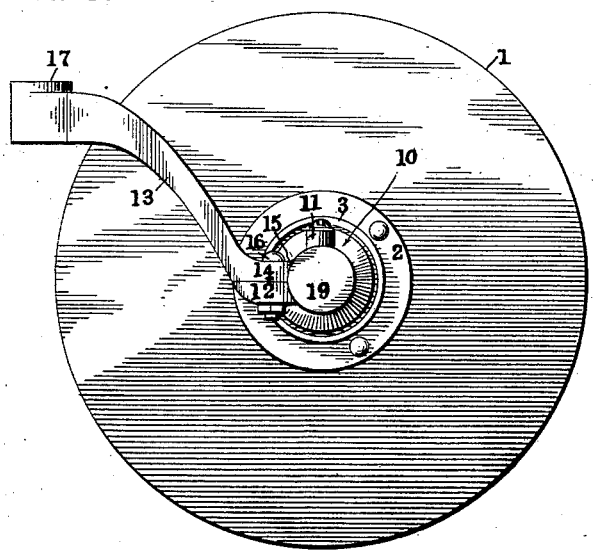
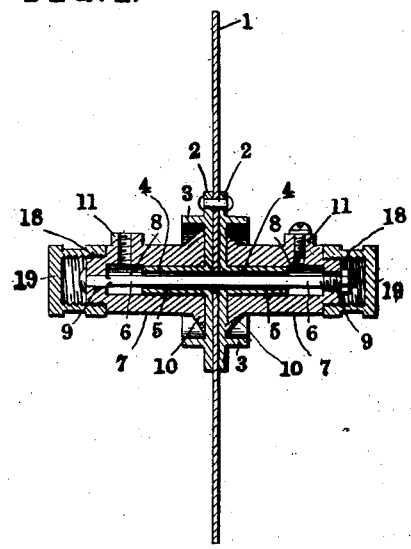
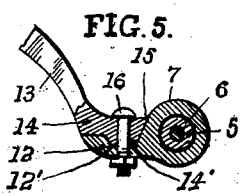
Witnesses
Chas. K. Davis.
E. E. Carrick.
Inventor
Aaron H. Johnson
by Fenelon B. Brock
Attorney

UNITED STATES PATENT OFFICE.

AARON H. JOHNSON, OF MATTOON, ILLINOIS.

PLOW-COLTER.

SPECIFICATION forming part of Letters Patent No. 714,912, dated December 2, 1902.

Application filed July 7, 1902. Serial No. 114,604. (No model.)

*To all whom it may concern:*

Be it known that I, AARON H. JOHNSON, a citizen of the United States, and a resident of Mattoon, in the county of Coles and State of Illinois, have invented certain new and useful Improvements in Plow-Colters, of which the following is a specification.

My invention relates to plows.

The object of my invention, more particularly stated, consists in providing a plow with a colter-wheel bearing designed to effectually exclude sand, dust, and other extraneous matter, to provide an easily-revoluble bearing having ample oil-lubricating capacity and a novel attachment to the plow-beam.

For these purposes my invention consists in the following construction and combination of parts, the details of which will first be fully set forth and the features of novelty embodied therein then set forth in the claims.

Figure 1 represents in a perspective view a colter-wheel to which I have applied my improvements. Fig. 2 is a top plan view of the same. Fig. 3 is a side elevation. Fig. 4 is a central vertical section taken through the colter-bearing. Fig. 5 is a detailed sectional view of one of the fork-arms broken away.

In the drawings, 1 represents the colter-wheel, of the usual variety.

2 represents the annular bearing-plates, secured one upon each side of the wheel. These plates are provided with annular sand-bands projecting outward therefrom. Each plate carries also a short stub-axle 4, projecting in axial alinement and having central bearing-apertures 5, through which the tie bearing-bolt 6 passes, secured by any suitable means— for instance, by a bolt-head and nut at the opposite ends.

7 represents the bearing-boxes proper, which are rights and lefts and have central bearings within which the stub-axles 4 revolve. These bearings are continued outwardly beyond the stub-axles to form oil-reservoirs 8 in line with the bearings, the outer ends of which are pierced by similar axial apertures 9, which form the bearings for the tie-bolt 6. One of these apertures 9 is preferably angular for the purpose of preventing the rotation of the tie-bolt 6. The inner ends of the bearing-boxes 7 are provided with flanges 10, having inclined outer faces.

The rotation of the sand-bands 3 on the colter-wheel in contact with the inclined faces of flanges 10 serve by that motion to automatically exclude and throw out any extraneous matter which may attempt to find lodgment at these points.

11 represents the oil-cups upon the bearings.

12 represents lugs formed upon the sides of the boxes 7 and provided with bolt-holes and countersunk depressions 12, within which register the lower ends of the colter-fork 13. These lower ends are provided with projections 14 and inclined angular faces 15, which bear against the outer surfaces of the boxes 7, whereby one bolt 16, passing through the ends of each fork, serves to rigidly connect the bearings to the fork.

17 is the usual vertical bearing at the upper end of the fork, where it is swiveled to the plow-beam.

The outer ends of the boxes 7 have their exteriors flanged and provided with screw-threads 18 to receive the screw-nuts 19, which are screwed tightly in place to exclude the entrance of dirt and prevent the escape of the lubricant.

The cylindrical bearings and the short stub-axles may be substituted by the use of ball-bearings of any known type.

Having described my invention, what I claim as new, and desire to secure by Letters Patent, is—

1. In a colter, a wheel, plates secured to the opposite sides of the wheel each provided with a tubular short stub-axle and a sand-band concentric and exterior thereto, bearing-boxes on opposite sides of the colter-wheel within which said stub-axles rotate, annular bearings in the same projecting outwardly beyond the stub-axles and having axial openings of reduced diameter in the ends thereof, caps engaging the ends of the boxes and lugs projecting from one side of the bearing-boxes.

2. In a colter, a wheel, plates secured to the opposite sides of the wheel each provided with a tubular short stub-axle and a sand-band concentric and exterior thereto, bearing-boxes on opposite sides of the colter-wheel within which said stub-axles rotate, having outwardly-inclined flanges secured to their inner ends, annular bearings in the same projecting outwardly beyond the stub-axles and having axial openings of reduced diameter in the ends thereof, caps engaging the ends of the boxes and lugs projecting from one side of the bearing-boxes.

3. In a colter, a wheel, plates secured to the opposite sides of the wheel each provided with a tubular short stub-axle and a sand-band concentric and exterior thereto, bearing-boxes on opposite sides of the colter-wheel within which said stub-axles rotate, having outwardly-inclined flanges secured to their inner ends, annular bearings in the same projecting outwardly beyond the stub-axles and having axial openings of reduced diameter in the ends thereof, caps engaging the ends of the boxes, lugs projecting from one side of the bearing-boxes having depressions therein, and a swiveled colter-fork having projections corresponding to the depressions in the said lugs and angular inclined faces adapted to rest closely against the bearing-boxes whereby one bolt secures rigidly each fork to its lug.

In testimony whereof I have affixed my signature in the presence of two witnesses.

AARON H. JOHNSON.

Witnesses:
 FRANK KERN,
 F. N. HENLEY.